Oct. 12, 1965   G. H. LEONARD   3,212,065
ELECTRO-MECHANICAL ON-THE-FLY READING MEANS
Filed Nov. 10, 1960                                        2 Sheets-Sheet 1
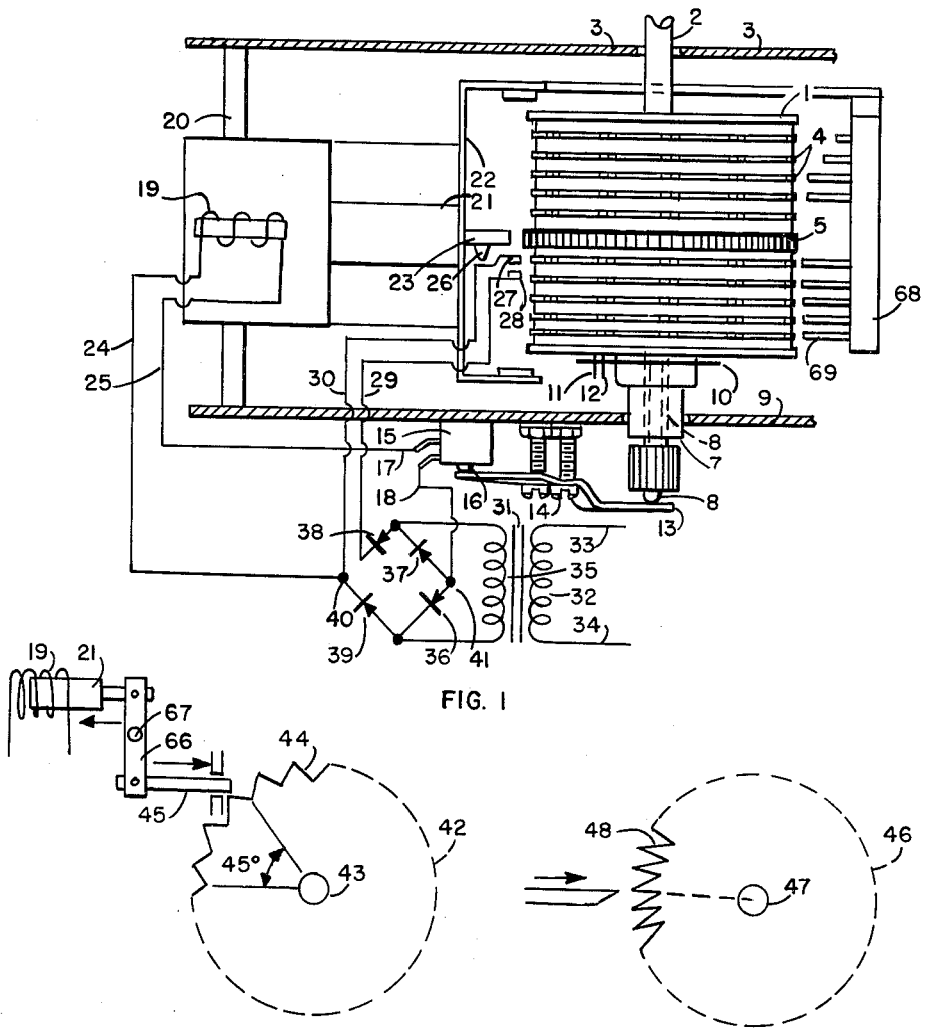
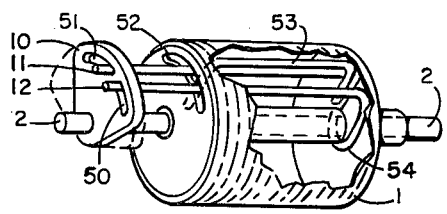
FIG. 4
*INVENTOR.*
GEORGE H. LEONARD
BY
*Alfred W. Barber*
ATTORNEY INVENTOR.
GEORGE H. LEONARD
BY
Alfred W. Barber
ATTORNEY 3,212,065
ELECTRO-MECHANICAL ON-THE-FLY READING MEANS
George H. Leonard, Darien, Conn.
(90 Lincoln Ave., Stamford, Conn.)
Filed Nov. 10, 1960, Ser. No. 68,475
5 Claims. (Cl. 340—173)

The present invention concerns analog to digital converter readout devices and, in particular, the detenting and actuation of such readout devices.

Analog to digital converters may take many forms. In the case of the present invention the converter consists in a series of drums carrying profiled discs providing contoured calibration surfaces. These drums are geared together in order to maintain predetermined ratios between the drums as, for example, 100 to 1. The first drum in the series is usually intended to be coupled to a rotating shaft to be monitored. The first drum usually turns at the same speed as the shaft being monitored although it may be geared to step up or down, the second drum at $1/100$ the speed and the third at $1/10,000$ the speed or other desired ratios. The most familiar object of the device is actually to count the revolutions and fractions of a revolution of the monitored shaft. The profiling of the discs carried by the drums is divided into two or three level coded steps which may be read out. In order to read the profiles of the drums, feelers are provided to probe them. In order to read the drum positions, it is necessary to stop the rotation of the drums momentarily. The first drum is stopped by a detent device which stops the drum and positions it for nonambiguous reading. One aspect of the present invention concerns the detent device which is designed to eliminate the possibility of yielding an ambiguous reading.

Since the reading may be accomplished in a very short interval of time, the readout may be accomplished by momentarily stopping the drum but without actually disconnecting it from the shaft being monitored. This is accomplished with a device which constitutes another phase of the present invention and consists in what is called a lost-motion coupler. This coupler is a device which allows continued rotation of the input shaft while the drum is stopped for reading out, and restores the drum position to what it would have been were it not stopped.

In the drawing:

FIG. 1 is a general view, partly in schematic representation of one form of the present invention.

FIGS. 2 and 3 show two possible forms of detent suitable for use in accordance with the present invention.

FIG. 4 shows details of one form of lost motion coupler suitable for use in accordance with the present invention.

Figure 5:
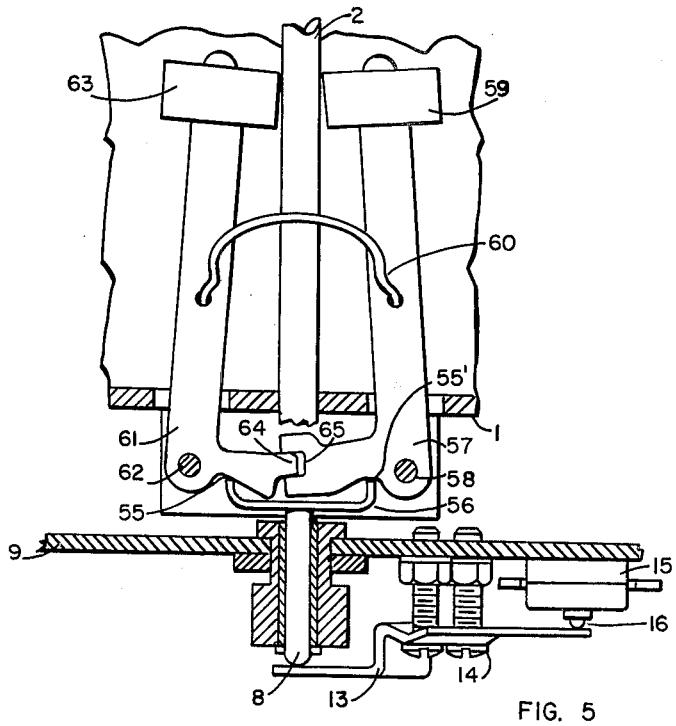
FIGS. 5 and 6 show details of a contrifugally operated cut-out switch suitable for use in accordance with the present invention.

FIG. 1 shows a drum 1, carrying a plurality of profiled discs 4 and a detent toothed ring 5, mounted on an input or coupling shaft 2 journalled in frame 3–9. One end of shaft 2 is hollow to house governor output plunger 8, and carrying fitting 10 for holding the ends 11 and 12 of the lost motion coupler spring 59 (see FIGS. 4, 5 and 6). The plunger 8 is adapted to slide into shaft 2 when drum 1 is turning faster than a predetermined speed due to the action of the governor to be described in more detail in connection with FIGS. 5 and 6. The contacts of governed switch 15 are connected over leads 17 and 18 in series with solenoid coil 19 over leads 24 and 25 and a source of solenoid power including transformer 32–35 and rectifier 36–37–38–39. Thus, if alternating current line power is applied over leads 33 and 34 to actuate solenoid 19 as in making a reading of the position of drum 1, such a reading will be prevented by the opening of switch 15 when drum 1 is being rotated above a predetermined speed. This speed will in turn be determined by the action of the governor shown in FIGS. 5 and 6.

When a reading of drum 1 is to be made by probing profiled discs 4 by reading head 68 and fingers 69, solenoid 19 is energized by applying power over leads 33 and 34 pulling in plunger 21 and pushing detent tongue 23, due to toggle action (see FIG. 2) into a tooth of ring 5 and stopping drum 1 at a predetermined and unambiguous reading position. The power supplied to solenoid coil 19 flows through rectifiers 37 and 40 and since it is essentially a half-wave rectified current, contains a large line frequency ripple, causing tongue 23 to vibrate. This vibrating prevents the point of tongue 23 from hanging up on a point of toothed ring 5. Once tongue 23 has locked with a tooth of ring 5, switch 27–28 is closed by suitable means such as projection 26 on tongue 23. The closing of switch 27–28 closes a circuit over leads 29–30 to point 40 and rectifiers 38 and 39 of the rectifier system and converts it to a full wave rectifier circuit supplying sufficiently more power, to positively actuate the other functions of the device.

FIGS. 2 and 3 show forms of detent tongue and ring teeth so shaped and located as to preclude the chance of stopping drum 1 at a position where the reading of the profiled discs would be ambiguous. The detent tongue 45 of FIG. 2 is square ended and when seated meshes with a tooth the point of which lies on a radial line advantageously 45 degrees from the horizontal line of motion. The profiled discs on drum 1 are phased so that when arm 45 is in complete mesh with a tooth 44 an unambiguous reading only is possible. It will be seen that if tongue 45 meets one of teeth 44 at other than a full mesh position, it will push the detent ring 42 along until a full mesh position is achieved. The detent arrangement of FIG. 3 has the same result in providing unambiguous positioning of drum 1 to which it is attached. This detent tongue 49 positions ring 46 correctly for reading drum 1 when it is fully meshed with one of teeth 48. Thus, if tongue 49 comes to one of ring teeth 48 at some other position than one which finds a matching notch directly opposite, tongue 49 will push the tooth into matching position. It will be seen that this mismatch and pushing of a tooth can take place only in one direction. It will also be seen that even were the tongue and tooth to hang-up point to point that the drum would be essentially in reading position since a very slight rotation of the tooth would bring it into full-meshed reading positions one or the other of the two each of which is equally accurate, statistically, depending on the orientation.

FIG. 4 shows a portion of the system of FIG. 1 giving details of the lost-motion coupling device. This figure shows drum 1 mounted on shaft 2. Sector 10 is attached to shaft 2, and is provided with slots 50 and 51 for receiving ends 11 and 12 of spring 54. Drum 1 is also provided with slot 52 for passing portions of spring 54. Spring 54 is attached to shaft 2 and is preloaded to press against stop 53 so that rotation of sector 10 rotates drum 1 through pressure of spring ends 11 and 12. Spring 54 has sufficient stiffness to cause drum 1 to follow the motion of spring ends 11 and 12 as long as drum 1 is free to rotate. When drum 1 is stopped by the detent action as described above, shaft 2 may be continued in its rotational motion by the external device being monitored, and sector 10 will continue to rotate against the spring pressure from spring 54 transmitted by spring end 11 or 12 depending on the direction of rotation. When the drum is freed again it brings it back to its normal position with respect to shaft 2 as though it had never been stopped. Spring ends 11 and 12 have a bias toward stop 53 so that no indeterminate position of zero torque or back-lash exists between drum 1 and shaft 2. The relationship between permissible shaft speed at reading time, lost motion coupler angle of travel and read out time will be discussed in connection with the governor shown in FIGS. 5 and 6.

Figure 6:
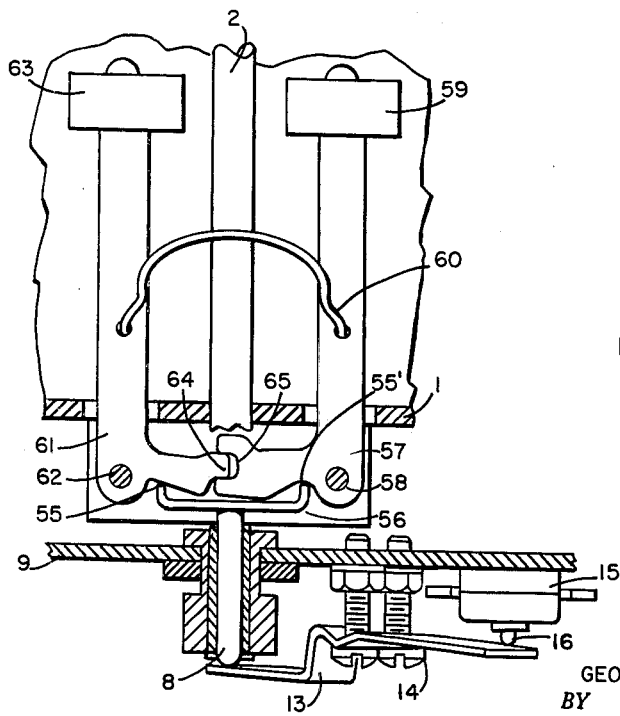

FIGS. 5 and 6 show the governor which is used to lock-out the operation of the reading mechanism when the input shaft is rotating above a predetermined speed at the time a reading is to be taken. FIGS. 5 and 6 are the same except that FIG. 5 shows the governor position when the drum is at rest or below the set speed, and FIG. 6 shows the governor position when drum 1 is being turned at a speed greater than a predetermined speed. This predetermined speed is determined as a speed just under the speed which would cause drum 1 to travel further than the range of the lost motion coupler during the time when the drum is stopped to make a reading. The relationship is shown by the equation. Shaft speed in revolutions per minute equals lost motion coupler limit angle in degrees divided by 360 degrees times the time in minutes the drum is stopped for making a reading. Typical values are of the order of lost motion coupler angle 30 degrees in either direction, maximum drum speed before governor cuts off power 240 revolutions per minute and time drum may be stopped for reading 20 milliseconds.

In FIG. 5 drum 1 carried by shaft 2 and supported by end plate 9 carries a governor which includes arms 57 and 61 pivoted at 58 and 62 and carrying weights 59 and 63 respectively. These two arms are coupled by tongue 64 and slot 65 so that if one arm tends to move due to gravity, the other arm is pushed in the opposite direction resulting in a governor which is insensitive to position. The two arms are formed to equally contact coupling yoke 56 at 55 and 55' abutting push pin 8 which in turn is coupled to switch 15 by means of arm 13 pivoted on adjustment screws 14 and pressing on switch actuating button 16. Arms 57 and 61 in the absence of rotational forces are urged toward each other by spring 60. This in turn pushes yoke 56, pin 8 and arm 13 outwardly and depresses button 16 turning switch 15 on, closing its circuit to external means (see FIG. 1).

Now if drum 1 is rotated as described above, the governor acts as shown in FIG. 6. The rotation of drum 1 causes arms 57 and 61 to tend to separate due to the centrifugal force on weights 59 and 63 which overcomes the restoring force of spring 60. As arms 57 and 61 separate, yoke 56 is allowed to move inwardly along with pin 8 and arm 13 so that button 16 moves outwardly and finally switch 15 goes off, and its circuit opens, interrupting the external power supply. As was described above this power is the power to the reading solenoid 19-21 and thus, when it is interrupted, no reading may be taken. The governor is designed and operated by proper choice of arm length, size of weights and restoring spring force so that switch 15 is opened whenever drum 1 is rotated above a predetermined speed. As set forth above the speed at which the governor opens switch 15, the lost motion coupler range of motion and the reading time are related in such a way as to prevent a reading from being taken if the motion of drum 1 would exceed the lost motion coupler range during a reading.

Thus has been described a digital transducer in which profiled peripheral calibrations are carried by a drum to be rotated by a device to be monitored. In order to read the rotational position of this drum, an electro-mechanical detent tongue is pushed into mating engagement with a tooth of a toothed detent ring carried by the drum. The detent tongue and ring teeth are shaped so that they mate to provide a predetermined position of a given calibration of said drum with respect to the reading means and so that if they meet point-to-point in a hang-up condition the drum will still be in essentially correct reading position. Another way of expressing this is to say is that the detent tongue and ring teeth are shaped so that the hang-up position is at a drum position in proximity or contiguous with its predetermined reading position. This detenting characteristic may be termed unambiguous since the drum can only be stopped at substantially the predetermined and correct position for reading.

While only a few embodiments of the present invention have been shown and described many modifications will be apparent to those skilled in the art and within the spirit and scope of the invention as set forth specifically in the appended claims.

What is claimed is:

1. In an analog to digital converter, the combination of, a drum carrying profiled calibrations coupled to a shaft to be monitored, reading means adapted to read said calibrations at discrete points, an unambiguous detent for stopping said drum for reading solely at one of said points, electro-mechanical means for actuating said detent, lost-motion means connected between said drum and said shaft to permit said shaft to rotate during said reading, and a governor controlled switch in series with said electro-mechanical means for preventing actuation of said detent in the presence of rotation of said shaft at a speed greater than a predetermined speed to prevent overdriving said lost motion means during the period of said reading.

2. In a digital transducer the combination of, a drum carrying calibrations around its periphery to be rotated by a device to be monitored, means for stopping said drum for a predetermined interval of time for reading said calibrations, a lost motion coupling between said device and said drum including a predetermined angle stop to permit rotation of said device during said reading time, a rotational speed operated governor coupled to said drum connected to a cut-out switch wherein said governor is set to operate at a drum speed in revolutions per second not greater than said the angle of said stop divided by 360 times said reading time in seconds.

3. In a digital transducer, the combination of, a drum bearing profiled calibrations to be rotated by a device to be monitored, electro-mechanical means to be actuated from an electric circuit including means for stopping the rotation of said drum for reading said calibrations, lost motion coupling means connected between said drum and said device for permitting a predetermined angular rotation of said device in the presence of arrested rotation of said drum, and a governor coupled to said drum and coupled to a switch for opening said electric circuit in the presence of drum rotational speeds above a predetermined limit.

4. In a digital transducer, the combination of, a drum carrying profiled calibrations around its periphery to be rotated by a device to be monitored, a toothed detent ring coupled to said drum, an electrical circuit operated detent tongue for engaging said detent ring for stopping said drum to permit reading said calibrations, and a source of ripple current in said electrical circuit sufficient to vibrate said tongue during at least a portion of its engagement operation to prevent hanging up of said detent tongue on the teeth of said ring.

5. In a digital transducer, the combination of, a drum carrying profiled calibrations around its periphery to be rotated by a device to be monitored, a toothed detent ring carried by said drum, an electrical circuit operated detent tongue for engaging said detent ring for stopping said drum to permit reading said calibrations, a source of ripple current in said electrical circuit sufficient to vibrate said tongue during at least a portion of its engagement operation to prevent hanging up of said detent tongue on the teeth of said ring, and a switch coupled to said tongue for reducing said ripple at a predetermined point in said engagement operation.

(References on following page)

References Cited by the Examiner

UNITED STATES PATENTS

| | | | |
|---|---|---|---|
| 1,480,276 | 1/24 | Leake | 200—153.20 |
| 1,766,078 | 6/30 | Kellner | 188—158 |
| 2,416,445 | 2/47 | Jensen | 340—174 X |
| 2,601,154 | 1/52 | Krueger et al. | 340—173 X |
| 2,673,320 | 3/54 | Oliwa | 318—462 |
| 2,747,854 | 5/56 | Schnepf | 200—80 X |
| 2,770,674 | 11/56 | Brewster | 340—174.1 |
| 2,936,352 | 5/60 | Patterson | 200—80 |
| 2,957,167 | 10/60 | Parrack | 340—174.1 |

IRVING L. SRAGOW, *Primary Examiner.*